US008098628B2

(12) United States Patent
Abeta et al.

(10) Patent No.: US 8,098,628 B2
(45) Date of Patent: Jan. 17, 2012

(54) TRANSMISSION CONTROL METHOD, MOBILE STATION, AND RADIO BASE STATION FOR PERFORMING A RANDOM ACCESS REQUEST AND RESPONSE

(75) Inventors: Sadayuki Abeta, Yokohama (JP); Minami Ishii, Yokohama (JP); Takehiro Nakamura, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 727 days.

(21) Appl. No.: 12/092,652

(22) PCT Filed: Nov. 2, 2006

(86) PCT No.: PCT/JP2006/321973
§ 371 (c)(1),
(2), (4) Date: Oct. 8, 2008

(87) PCT Pub. No.: WO2007/052746
PCT Pub. Date: May 10, 2007

(65) Prior Publication Data
US 2009/0116424 A1 May 7, 2009

(30) Foreign Application Priority Data
Nov. 4, 2005 (JP) ................................. 2005-321638

(51) Int. Cl.
*H04W 4/00* (2009.01)
*H04W 36/00* (2009.01)
*H04L 12/28* (2006.01)
(52) U.S. Cl. ......................... 370/331; 370/431; 455/436
(58) Field of Classification Search .................... None
See application file for complete search history.

(56) References Cited

U.S. PATENT DOCUMENTS

| 6,393,047 | B1 | 5/2002 | Popovic' | |
|---|---|---|---|---|
| 6,647,002 | B1 | 11/2003 | Suda et al. | |
| 7,733,897 | B2* | 6/2010 | Ko et al. | 370/447 |
| 2007/0047493 | A1* | 3/2007 | Park et al. | 370/331 |

FOREIGN PATENT DOCUMENTS

| EP | 1009184 A2 | 6/2000 |
|---|---|---|
| JP | 9-55693 A | 2/1997 |
| JP | 11-41656 | 2/1999 |
| JP | 2000-184442 | 6/2000 |
| JP | 2002-516515 | 6/2002 |

(Continued)

OTHER PUBLICATIONS

International Search Report for International Application No. PCT/JP2006/321973, mailed on Feb. 13, 2007 (5 pages).

(Continued)

*Primary Examiner* — Nittaya Juntima
(74) *Attorney, Agent, or Firm* — Osha Liang LLP

(57) ABSTRACT

A packet communication method according to the present invention includes: transmitting, at a mobile station, a random access request that includes mobile station information assigned to the mobile station, to a radio base station through a random access channel allocated to a predetermined radio resource; receiving, at the radio base station, the random access request from the mobile station; and transmitting, at the radio base station, a random access response signal that notifies the receipt of the random access request and includes the mobile station information, to the mobile station through a downlink shared control channel corresponding to the random access channel.

3 Claims, 10 Drawing Sheets

FOREIGN PATENT DOCUMENTS

| TW | 471231 | 1/2002 |
|---|---|---|
| TW | 567694 | 12/2003 |
| TW | 582158 B | 4/2004 |
| WO | WO-99/60729 | 11/1999 |
| WO | 0005915 A1 | 2/2000 |
| WO | 0022866 A1 | 4/2000 |
| WO | 0186889 A1 | 11/2001 |
| WO | 2004100598 A1 | 11/2004 |
| WO | 2007/066882 A1 | 6/2007 |

OTHER PUBLICATIONS

Patent Abstracts of Japan for Japanese Publication No. 2000-184442, Publication date Jun. 30, 2000 (1 page).

Patent Abstracts of Japan for Japanese Publication No. 09-055693, Publication date Feb. 25, 1997 (1 page).

Patent Abstracts of Japan for Japanese Publication No. 11-041656, Publication date Feb. 12, 1999 (1 page).

3GPP TS 25.213 v5.5.0; 3rd Generation Partnership Project; Technical Specification Group Radio Access Network; Spreading and modulation (FDD) (Release 5) Dec. 2003 (28 pages).

3GPP TS 25.211 v5.6.0; 3rd Generation Partnership Project; Technical Specification Group Radio Access Network; Physical channels and mapping of transport channels onto physical channels (FDD) (Release 5) Sep. 2004 (51 pages).

3GPP TS 25.211 v6.7.0; 3rd Generation Partnership Project; Technical Specification Group Radio Access Network; Physical channels and mapping of transport channels onto physical channels (FDD) (Release 6) Dec. 2005 (50 pages).

3GPP TS 25.214 v6.8.0; 3rd Generation Partnership Project; Technical Specification Group Radio Access Network; Physical layer procedures (FDD) (Release 6) Mar. 2006 (60 pages).

3GPP TR 25.814 v7.0.0; 3rd Generation Partnership Project; Technical Specification Group Radio Access Network; Physical layer aspects for evolved Universal Terrestrial Radio Access (UTRA) (Release 7) Jun. 2006 ((126 pages).

Taiwanese Office Action for Application No. 095140795, mailed on Feb. 5, 2010 (8 pages).

English abstract for Taiwanese Publication No. 582158, publication date Apr. 1, 2004 (1 page).

Russian Office Action for Application No. 2008120134/09, mailed on Sep. 14, 2010 (8 pages).

Chinese Office Action received in Chinese Application No. 200680041043.8, mailed Feb. 25, 2011, and English translation thereof, 12 pages.

Office Action for Japanese Patent Application No. 2009-195942 mailed Mar. 29, 2011, with English translation thereof (4 pages).

Extended European Search Report for Application No. 06822891.5 dated Jul. 28, 2011 (12 pages).

Kamran Etemad, Wireless Facilities Inc. "Enhanced Random Access and Reservation Scheme in CDMA2000"; XP-011092422; US; Apr. 2001 (7 pages).

* cited by examiner

FIG. 4

| PREAMBLE | n VALUE | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |

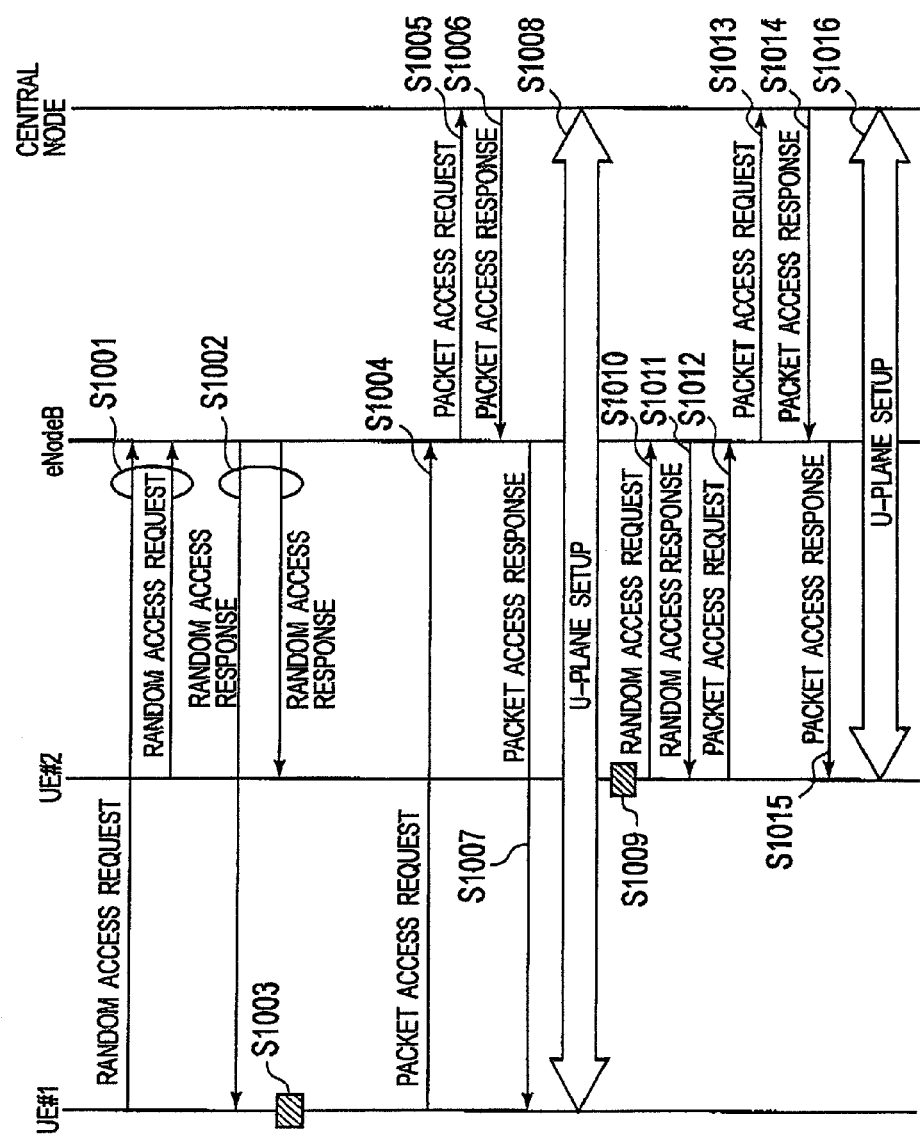

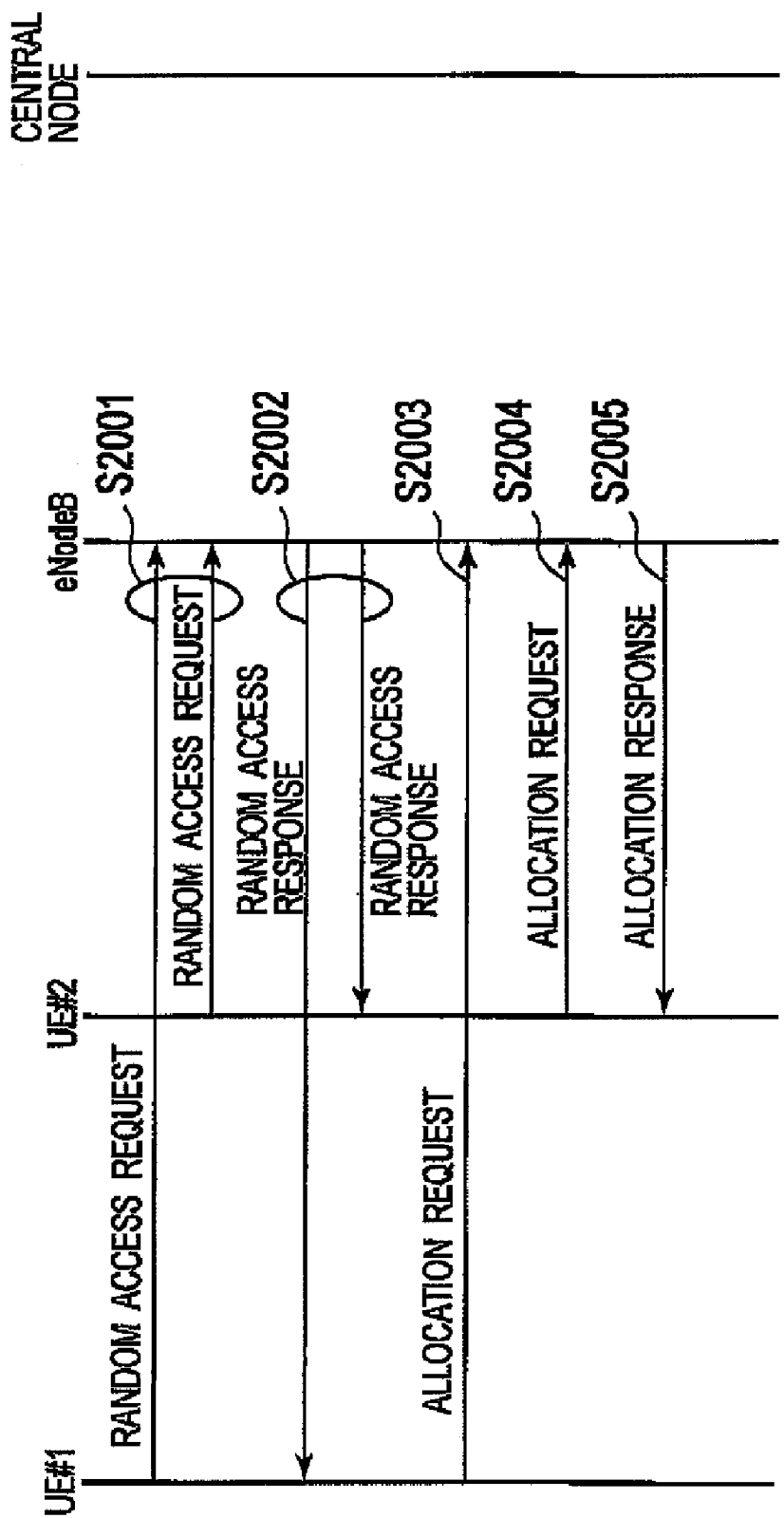

TRANSMISSION CONTROL METHOD, MOBILE STATION, AND RADIO BASE STATION FOR PERFORMING A RANDOM ACCESS REQUEST AND RESPONSE

CROSS-REFERENCE TO RELATED APPLICATIONS

This is a national stage application of PCT/JP2006/321973 filed on Nov. 2, 2006, which claims priority to Japanese Patent Application No. 2005-321638 filed on Nov. 4, 2005.

TECHNICAL FIELD

The present invention relates to transmission control methods, mobile stations, and radio base stations.

BACKGROUND ART

In a conventional mobile communication system, when a communication link is not established between a mobile station UE and a radio base station NodeB, the mobile station UE needs to transmit a signal to the radio base station NodeB by some means.

The mobile station UE can determine a transmission power to be used at the mobile station UE, by using a random access channel (hereinafter, RACH) at a physical layer.

As an example of transmitting a signal to the radio base station NodeB through the RACH, a method using a power ramping can be considered. In this method, the mobile station UE transmits a single random access request as needed, and recognizes a failure of the transmission when an acknowledgment of the random access request transmitted from the radio base station NodeB cannot be received.

An example of the power ramping in the W-CDMA (Wideband Code Division Multiple Access) will be described. Firstly, the mobile station UE transmits, to the radio base station NodeB, a preamble signal as the random access request. Here, the mobile station UE transmits the random access request while gradually increasing the transmission power.

The radio base station NodeB receives the random access request from the mobile station UE, and transmits a random access response for notifying the receipt of the random access request, to the mobile station UE through a downlink control channel.

In response to the receipt of the random access response from the radio base station NodeB, the mobile station UE stores the transmission power used for the most recent transmission of the random access request, which is transmitted to the radio base station NodeB.

Subsequent to the random access request, the mobile station UE transmits, to the radio base station NodeB, an allocation request for a control channel or the like, by using a transmission power equal to or higher than the stored transmission power.

The radio base station NodeB receives the allocation request from the mobile station UE, and transmits an allocation of a control channel or the like, to the mobile station UE. Thereby, the communication link is established between the mobile station UE and the radio base station NodeB (see Non-patent document 1 and Non-patent document 2, for example).

However, in the conventional mobile communication system, a collision can be occurred when multiple mobile stations UE simultaneously transmit signals to the radio base station NodeB by using the RACH (Random Access Channel). In that case, the conventional mobile communication system has a problem that the mobile station UE erroneously determines that the radio base station NodeB has received the random access request transmitted from the mobile station UE.

With reference to FIG. 11, an example in which the mobile station UE makes an erroneous determination will be described. In FIG. 11, neither a mobile station UE #1 nor a mobile station UE #2 has a communication link with a radio base station NodeB. Here, an example will be described for a case in which the mobile station UE #1 erroneously determines that an access request has been successfully transmitted to the radio base station NodeB although the transmission of the access request has not been successful.

In Step S2001, the mobile station UE #1 transmits a random access request to the radio base station NodeB through the RACH.

Here, assume that the base station NodeB has not received the random access request transmitted from the mobile station UE #1 for a reason that the transmission power is too small, or the like.

In addition, in Step S2001, the mobile station UE #2 transmits a random access request to the radio base station NodeB through the RACH at the same timing as the transmission of the random access request from the mobile station UE #1.

Here, each of the random access request transmitted from the mobile station UE #1 and the mobile station UE #2 collide with each other, and is transmitted to the radio base station NodeB.

In Step S2002, the radio base station NodeB receives the random access request, and transmits a random access response for notifying the receipt of the random access request, to the mobile station UE #1 through a downlink shared control channel corresponding to the RACH used for transmitting the random access request.

In addition, in Step S2002, the radio base station NodeB receives the random access request, and transmits a random access response for notifying the receipt of the random access request, to the mobile station UE #2 through the downlink shared control channel corresponding to the RACH used for transmitting the random access request.

In Step S2003, the mobile station UE #1 receives the random access response through the downlink shared control channel, and then transmits an allocation request to the radio base station NodeB.

Here, the mobile station UE #1 erroneously determines that the random access request transmitted from the mobile station UE #1 has been received at the radio base station NodeB. Moreover, the transmission power used for transmitting the allocation request from the mobile station UE #1 to the radio base station NodeB does not allow the allocation request to be received at the radio base station NodeB.

In Step 2004, the mobile station UE #2 receives the random access response through the downlink control channel, and then transmits an allocation request to the radio base station NodeB.

In Step S2005, the radio base station NodeB transmits an allocation response for notifying the receipt of the allocation request, to the mobile station UE #2 through the downlink control channel.

As described above, the conventional mobile communication system has a problem that the mobile station UE may erroneously determine that the random access request transmitted from the mobile station UE has been received at the radio base station NodeB.

Further, in that case, another problem arises that a processing delay occurs at the mobile station UE until the determination made by the mobile station UE is turned out to be erroneous.

Moreover, in that case, still another problem arises that resource is wasted at the mobile station UE until the determination made by the mobile station UE turns out to be erroneous.

Non-patent document 1: 3GPP TS 25.213 V5.5.0
Non-patent document 2: 3GPP TS 25.211 V5.6.0

DISCLOSURE OF THE INVENTION

The present invention has been made in view of the above-described problems, and has an object of providing a packet communication method, a mobile station, and a radio base station, which can reduce an occurrence of an erroneous determination made at the mobile station when a packet communication is initiated between the mobile station and the base station.

A first aspect of the present invention is summarized as including; transmitting, at a mobile station, a random access request that includes mobile station information assigned to the mobile station, to a radio base station through a random access channel allocated to a predetermined radio resource; receiving, at the radio base station, the random access request from the mobile station; and transmitting, at the radio base station, a random access response signal that notifies the receipt of the random access request and includes the mobile station information, to the mobile station through a downlink shared control channel corresponding to the random access channel.

The first aspect of the present invention may further includes; transmitting, at the mobile station, the random access request to the radio base station through the random access channel, by changing the radio resource used for transmitting the random access channel, when the mobile station fails to receive, from the radio base station, the random access response signal that includes the mobile station information.

A second aspect of the present invention is summarized as a mobile station, including: a random access request transmitter unit configured to transmit a random access request that includes mobile station information assigned to the mobile station, to a radio base station through a random access channel defined by a predetermined radio resource; and a random access response receiver unit configured to receive a random access response that includes the mobile station information.

A third aspect of the present invention is summarized as a radio base station, including: a random access receiver unit configured to receive a random access request that includes mobile station information assigned to a mobile station, from the mobile station through a random access channel defined by a predetermined radio resource; and a random access response transmitter unit configured to transmit a random access response signal that notifies the receipt of the random access request and includes the mobile station information, to the mobile station through a downlink shared channel corresponding to the random access channel.

BRIEF DESCRIPTION OF THE DRAWINGS

FIG. 4 is a diagram showing an example of the format of mobile station information, the format being used in the mobile communication system according to the first embodiment of the present invention.

FIG. 10 is a sequence diagram showing operations in the mobile communication system according to the first embodiment of the present invention.

FIG. 11 is a sequence diagram showing operations in a mobile communication system according to a conventional technique.

BEST MODE FOR CARRYING OUT THE INVENTION (Mobile Communication System According to First Embodiment of the Present Invention)

A configuration of a mobile communication system according to a first embodiment of the present invention will be described with reference to FIGS. 1 to 5.

Figure 1:
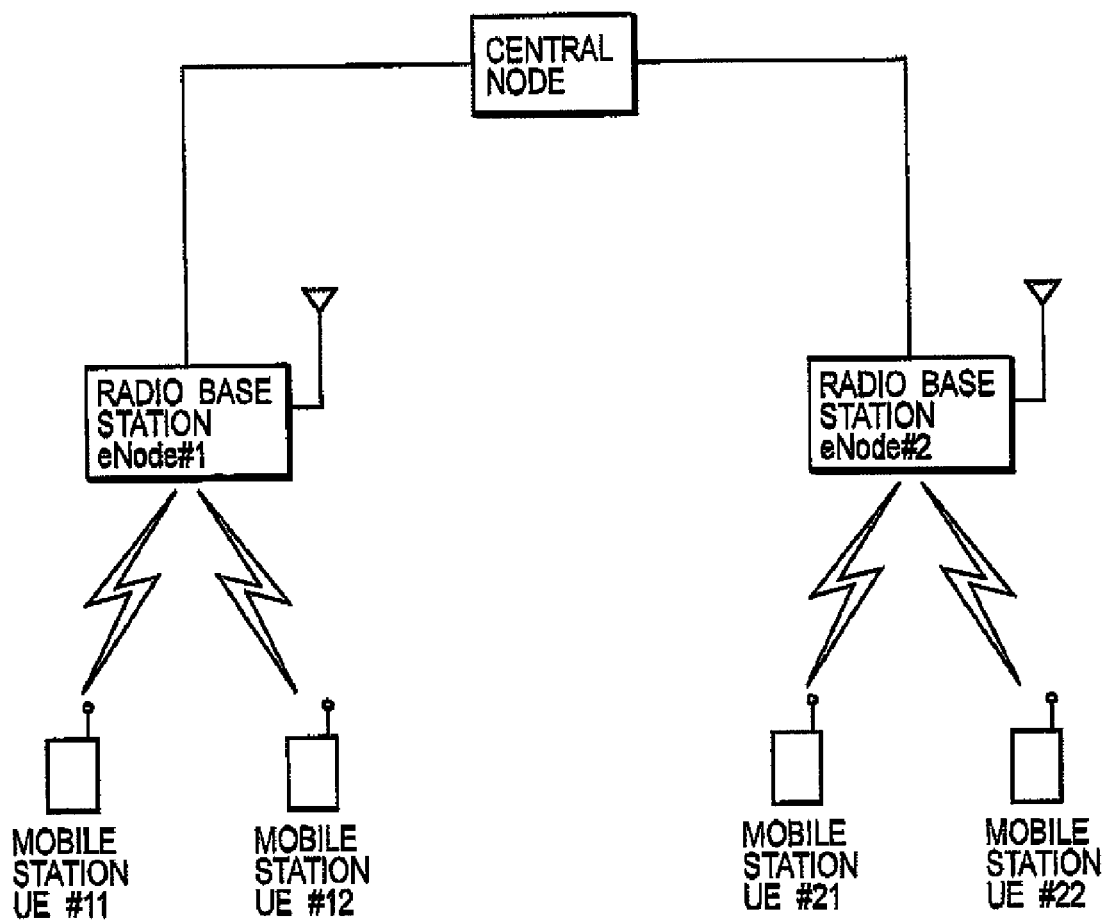
FIG. 1 is an entire configuration diagram of a mobile communication system according to a first embodiment of the present invention.

As shown in FIG. 1, the mobile communication system according to the present embodiment includes a plurality of radio base stations; radio base stations eNodeB #1 and eNodeB #2, and a central node (such as an access router, a radio network controller RNC or the like) that controls the plurality of radio base stations eNodeB #1 and eNodeB #2.

In the mobile communication system according to the present embodiment, each of a mobile station UE is configured to initiate a packet communication by a random access control, through a radio base station eNodeB and the central node (such as an access router or a radio network controller RNC). Here, the radio base station eNodeB controls a cell in which the mobile station UE is located.

Figure 2:
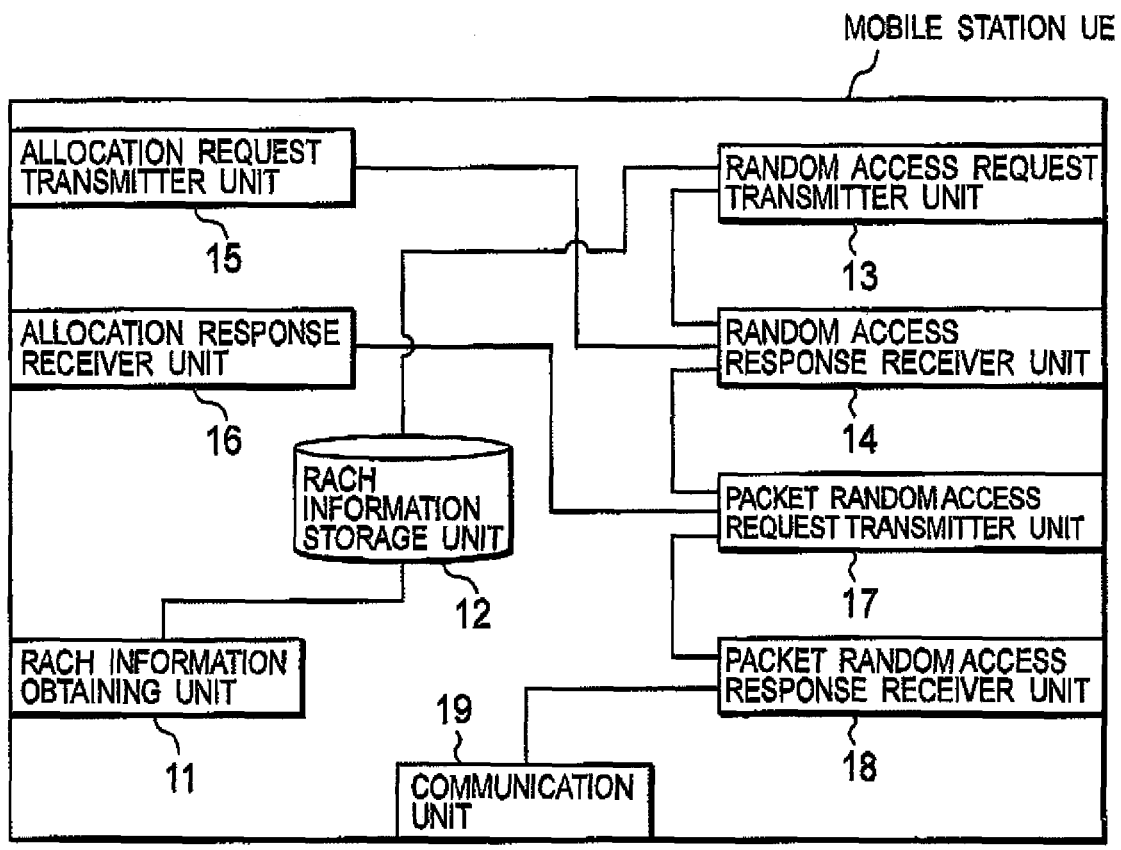
FIG. 2 is a functional block diagram of a mobile station according to the first embodiment of the present invention.

As shown in FIG. 2, the mobile station UE is provided with a RACH information obtaining unit 11, a RACH information storage unit 12, a random access request transmitter unit 13, a random access response receiver unit 14, an allocation request transmitter unit 15, an allocation response receiver unit 16, a packet access request transmitter unit 17, a packet access response receiver unit 18, and a communication unit 19.

The RACH information obtaining unit 11 is configured to obtain RACH information and to store the obtained RACH information in the RACH Information storage unit 12. Here, the RACH information is notified through a downlink shared channel allocated to the mobile station UE or a broadcast channel transmitted from a cell in which the mobile station UE is located.

For example, when the mobile station UE performs a handover, the RACH information obtaining unit 11 may be configured to obtain the RACH information from the radio base station eNodeB, which is a destination of the handover.

As the broadcast channel, such as a broadcast channel (BCH) defined in 3GPP, or the like can be assumed.

As the downlink shared channel, such as a downlink shared control channel or a downlink shared data channel or the like can be assumed.

The RACH information includes such as information for identifying the random access channel, mobile station information assigned, by the radio base station eNodeB, to the mobile station UE located in the cell controlled by the radio base station eNodeB, and the like.

Moreover, the RACH information may also include information for identifying the downlink shared data channel and the downlink shared control channel corresponding to the random access channel.

Furthermore, the RACH information may also include a transmission timing of a random access request.

Here, the mobile station information may be a preamble signal pattern (a RACH signature) to be used by the mobile station UE, the preamble signal pattern being specified when a handover is performed, by the radio base station eNodeB, which is the destination of the handover, (see FIG. 4).

Alternatively, the mobile station information may be identification information unique to the mobile station UE, a numerical value randomly generated, or a combination of QoS information and the numerical value randomly generated.

The mobile station information may also be information for specifying a sequence number to be used, of a numerical value table previously provided with the mobile station UE.

Here, as a random access channel (RACH) defined in 3GPP ($3^{rd}$ Generation Partnership Project) or the like can be assumed to be the random access channel. Accordingly, the random access channel will be described as "RACH" hereinbelow.

Specifically, the RACH information includes information for specifying a radio resource allocated to the RACH, the downlink shared control channel corresponding to the RACH, or the downlink shared data channel.

Here, it is assumed that the information for specifying the radio resource specifies: a frequency resource (frequency band), a time resource (time slot or TTI), a code resource (spread code), or a combination of the above-described resources.

Further, the RACH information may include multiple pieces of information for specifying the above-described radio resources.

In addition, in the mobile communication system according to the present embodiment, the radio resource allocated to the RACH or to the downlink shared control channel corresponding to the RACH may be predetermined.

Note that a random access response is transmitted through at least one of the downlink shared data channel and the downlink shared control channel corresponding to the RACH. Here, the random access response notifies the receipt of the random access request transmitted through the RACH.

The random access request transmitter unit 13 is configured to form and transmit a random access request that includes the mobile station information assigned to the mobile station UE.

For example, the random access request transmitter unit 13 may be configured to form and transmit a random access request that includes the above-described identification information unique to the mobile station UE, as the mobile station information.

Alternatively, the random access request transmitter unit 13 may be configured to form and transmit a random access request that includes the above-described RACH signature (see FIG. 4), as the mobile station information.

Specifically, the random access request transmitter unit 13 may be configured to form and transmit a random access request that includes the preamble signal pattern (for example, a 16-bit Hadamard sequence shown in FIG. 4) specified by the radio base station eNodeB such as when the handover is performed.

Moreover, the random access request transmitter unit 13 may be configured to form and transmit a random access request that includes the preamble signal pattern, through a predetermined RACH at a transmission timing, for example, the transmission timing specified as the RACH information by the radio base station eNodeB such as when the handover is performed. Here, the transmission timing is included in the RACH information obtained by the RACH information obtaining unit 11.

The RACH information storing unit 12 may be configured to form and transmit the random access request by using a value sequentially selected from the numerical value table previously provided or a numerical value table randomly generated, as the mobile station information assigned to the mobile station UE.

Alternatively, the RACH information storing unit 12 may be configured to form and transmit a random access request by using a value randomly selected from the numerical value table previously provided or the numerical value table randomly generated, as the mobile station information assigned to the mobile station UE.

The RACH information storing unit 12 may also be configured to refer to the RACH information obtained at the RACH information obtaining unit 11 through a broadcast channel or the downlink shared channel allocated to the mobile station UE, and to form and transmit a random access request that includes the above-described mobile station information.

Further, the RACH information storing unit 12 may be configured to form a random access request that includes the QoS information, as the mobile station information allocated to the mobile station UE.

The random access request transmitter unit 13 is configured to refer to the RACH information storing unit 12, and to transmit the random access request, to the radio base station eNodeB that controls the cell in which the mobile station UE is located, through the RACH to which a predetermined radio resource is allocated.

Note that the random access request transmitter unit 13 may be configured to change, by using an arbitrary method, the RACH used for transmitting the random access request, when the RACH information storage unit 12 stores a plurality of the information for identifying the RACH or the downlink shared control channel corresponding to the RACH.

Moreover, the random access request transmitter unit 13 may be configured to change, by using an arbitrary method, the RACH used for transmitting the random access request, when the RACH information storage unit 12 stores a plurality of the information for identifying the RACH or the downlink shared control channel corresponding to the RACH and when the random access response receiver unit 14 fails to receive the access response signal that includes the mobile station information assigned to the mobile station UE.

Further, the random access request transmitter unit 13 may be configured to change the RACH used for transmitting the random access request or a pattern constituting the random access request (such as the 16-bit Hadamard sequence shown in FIG. 4), based on a service class, a cell, or a purpose.

In other words, the random access request transmitter unit 13 may be configured to change the RACH used for transmitting the random access request or the pattern constituting the random access request, depending on the purpose of transmitting the random access request.

The random access request transmitter unit 13 may change the RACH for transmitting the random access request or the pattern constituting the random access request, depending on the purpose of the transmission, such as; a random access request transmitted when a handover is performed; a random access request transmitted for establishing a radio link between the mobile station UE and the radio base station eNodeB; and a random access request transmitted for adjusting a timing in the radio link established between the mobile station UE and the radio base station eNodeB.

For example, the random access request transmitter unit 13 may use, as a pattern of the preamble signal included in the random access request transmitted when the handover is performed, the Hadamard sequences of $P_0(n)$ to $P_2(n)$, as shown in FIG. 4. Further, the random access request transmitter unit 13 may use, as a pattern of the preamble signal included in the random access request transmitted for establishing the radio link between the mobile station UE and the radio base station eNodeB, the Hadamard sequences $P_3(n)$ to $P_5(n)$ as shown in FIG. 4. In addition, the random access request transmitter unit 13 may use, as a pattern of the preamble signal included in the random access request transmitted for adjusting the timing in the radio link established between the mobile station UE and the radio base station eNodeB, the Hadamard sequences $P_3(n)$ to $P_5(n)$ shown in FIG. 4.

The random access response receiver unit 14 is configured to receive the random access response for notifying the receipt of the random access request, from the radio base station eNodeB through at least one of the downlink shared control channel corresponding to the RACH used for transmitting the random access request, and the downlink shared data channel.

Note that the random access response may be configured to notify the uplink shared channel to be used for transmitting the packet access request (corresponding to the message part, for example) which requests an initiation of a packet communication.

In other words, the random access response may be configured to include information for specifying the radio resource allocated to the aforementioned uplink shared channel.

The allocation request transmitter unit 15 is configured to transmit an allocation request for requesting the radio base station eNodeB to allocate and notify the radio resource allocated to the uplink shared channel, when the random access response does not include the Information for identifying the radio resource allocated to the uplink shared channel used for transmitting the packet random access request.

The allocation response receiver unit 16 is configured to receive an allocation response transmitted from the radio base station eNodeB in response to the allocation request. Note that the allocation response includes information for specifying the radio resource allocated to the uplink shared channel to be used for transmitting a packet random access request.

The packet access request transmitter unit 17 is configured to transmit is the packet access request for requesting an initiation of the packet communication, to the central node through the uplink shared channel notified by the random access response received at the random access response receiver unit 14.

Further, the packet access request transmitter unit 17 may be configured to transmit the packet access request for requesting the initiation of the packet communication, through the uplink shared channel notified by the random access response received at the allocation response receiver unit 18.

The packet access response receiver unit 18 is configured to receive a packet access response transmitted from the central node in response to the packet access request.

When the packet access response is received at the packet access response receiver unit 18, the communication unit 19 is configured to set a link for transmitting and receiving user data (U-plane) between the mobile station UE and the central node, and to perform a communication through the link.

Figure 3A:
FIG. 3 is diagrams each showing an example of the format of a RACH, the format being used in the mobile communication system according to the first embodiment of the present invention.
Figure 3B:

FIG. 3 is a diagram showing an example of a format of the RACH used in the mobile communication system according to the first embodiment of the present invention.

As shown in FIG. 3(*a*), the format of the RACH is configured to include a pilot signal, the mobile station information assigned to the mobile station UE, and the QoS (Quality of Service) information.

Alternatively, as shown in FIG. 3(*b*), the format of the RACH may be configured to include the pilot signal and the mobile station information assigned to the mobile station UE while the QoS information is included in the mobile station information assigned to the mobile station UE.

An example of the mobile station information assigned to the mobile station UE will be shown in FIG. 4. The example of the mobile station information shown in FIG. 4 is the preamble signal formed of the 16-bit Hadamard sequence.

The preamble signal may be configured to be randomly selected by the random access request transmitter unit 13. Alternatively, the preamble signal may be configured to be sequentially selected by the random access request transmitter unit 13. Further, the preamble signal may be configured to be specified by the RACH information stored in the RACH information storing unit 12.

Figure 5:
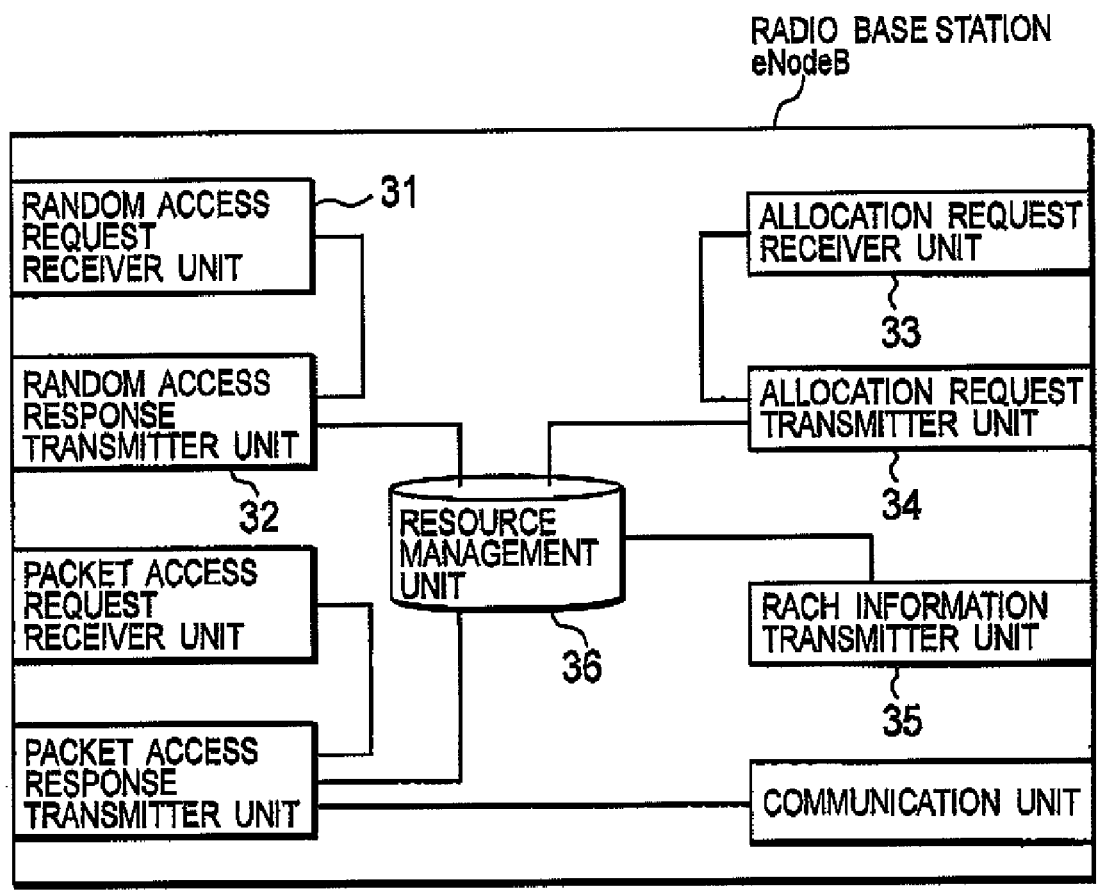
FIG. 5 is a functional block diagram of a radio base station according to the first embodiment of the present invention.
Figure 6:
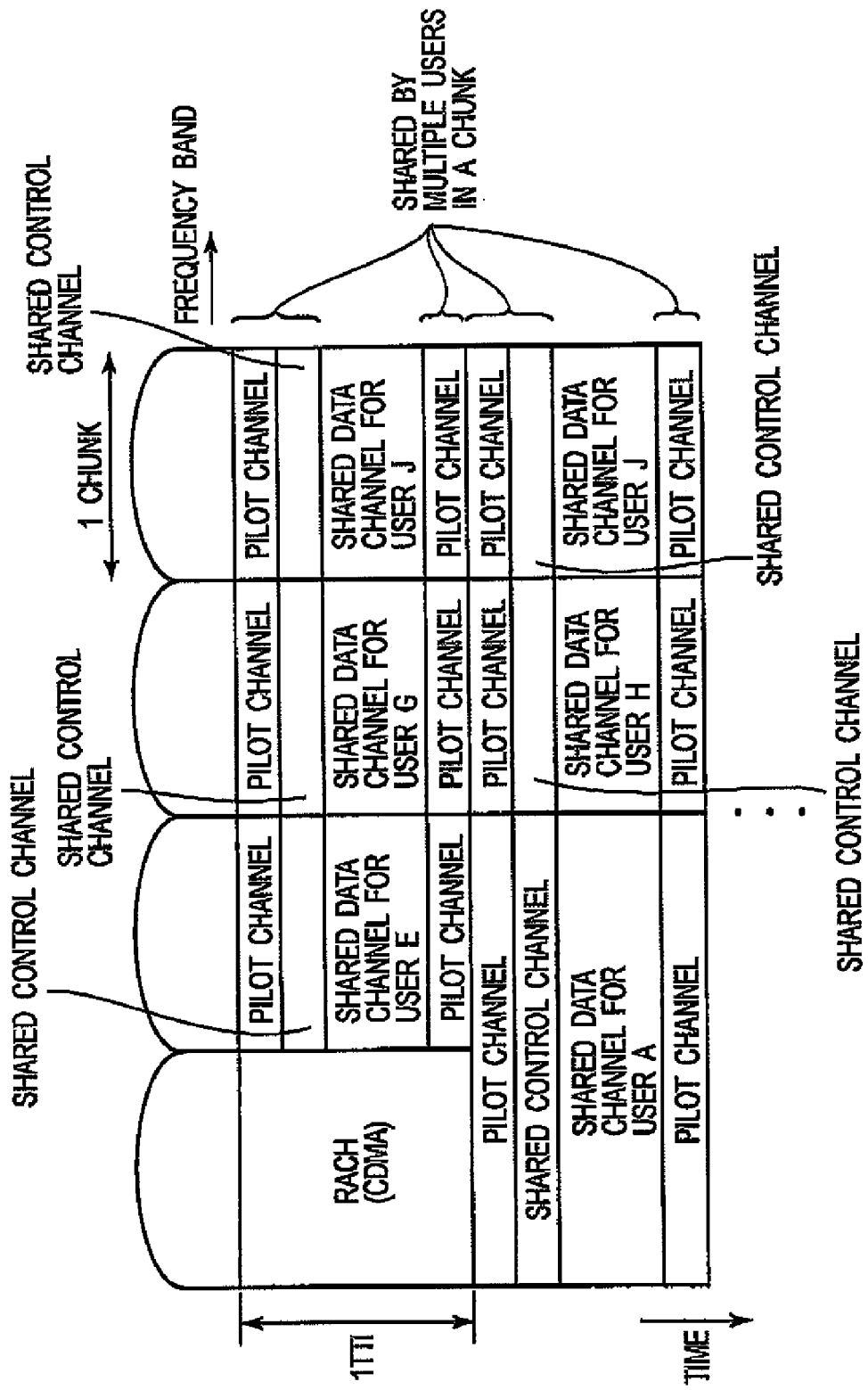
FIG. 6 is a diagram showing an allocation example of a resource of a radio uplink in the mobile communication system according to the first embodiment of the present invention.

The radio base station eNodeB shown in FIG. 5 is provided with a random access request receiver unit 31, a random access response transmitter unit 32, an allocation request receiver unit 33, an allocation response transmitter unit 34, a RACH information transmitter unit 36, and a resource management unit 36.

The random access request receiver unit 31 is configured to receive the random access request from the mobile station UE through the RACH to which the predetermined radio resource is allocated.

The random access response transmitter unit 32 is configured to refer to the resource management unit 36, and to transmit the random access response that includes the mobile station information assigned to the mobile station UE, so as to notify the receipt of the random access request.

Note that the random access response transmitter unit 32 is configured to refer to the resource management unit 36, and to notify, to the mobile station UE by the random access request, the uplink shared channel to be used for transmitting a packet random access request at the mobile station UE.

Specifically, the random access response transmitter unit 32 is configured to refer to the resource management unit 36, and to transmit, to the mobile station UE, the random access response that includes the information for specifying the radio resource allocated to the uplink shared channel to be used for transmitting the packet random access request at the mobile station UE.

The allocation request receiver unit 33 is configured to receive, from the mobile station UE through a channel to which the predetermined radio resource is allocated (such as the RACH and the uplink shared control channel), the allocation request for requesting the notification of the resource allocated to the uplink shared channel to be used for transmitting the packet random access request at the mobile station UE.

When the above-described allocation request from the mobile station UE is received at the allocation response transmitter unit 34, the allocation response transmitter unit 34 is configured to refer to the resource management unit 36, and to notify, to the mobile station UE by the allocation response, the uplink shared channel to be used for transmitting the packet random access request at the mobile station UE.

Specifically, the allocation response transmitter unit 34 is configured to refer to the resource management unit 36, and to transmit, to the mobile station UE, the allocation response that includes the information for specifying the radio resource allocated to the uplink shared channel to be used for transmitting the packet random access request at the mobile station UE.

The RACH information transmitter unit 35 is configured to refer to the resource management unit 36, and to notify the RACH, the downlink shared control channel corresponding to the RACH, or the downlink shared data channel, to the mobile station UE through the broadcast channel or the downlink shared channel allocated to the mobile station UE.

Specifically, the RACH information transmitter unit 35 is configured to so refer to the resource management unit 36, and to transmit, to the mobile station UE through the broadcast channel or the downlink shared channel allocated to the mobile station UE, the RACH information that includes the information for specifying the radio resource allocated to; the RACH, the downlink shared control channel corresponding to the RACH, or the downlink shared data channel.

Note that the RACH information transmitter unit 35 may be configured to change the RACH information to be notified to the mobile station UE (such as the radio resource allocated to; the RACH, the downlink shared control channel corresponding to the RACH, the downlink shared data channel), based on a cell, a service class, a purpose, or a reception level.

Further, the RACH information transmitter unit 35 may be configured to change the RACH information to be notified to the mobile station UE (such as the radio resource allocated to; the RACH, the downlink shared control channel corresponding to the RACH, and the downlink shared data channel), at a predetermined timing, depending on a traffic situation, a radio communication situation or the like.

The resource management unit 36 is configured to control each of the radio resources (a frequency resource, a time resource, and a code resource) allocated to respective channels in the uplink and the downlink. For instance, the resource management unit 36 is configured to control the radio resource allocated to the RACH, the downlink shared control channel corresponding to the RACH, or the downlink shared data channel.

FIG. 6 to FIG. 9 each shows examples of the radio resources allocated by the resource management unit 36 to the respective channels in the uplink and the downlink.

Here, the examples shown in FIG. 6 to FIG. 9 are configured such that the RACH is allocated in a frequency block A. Note that in the example of FIG. 6, multiple RACHs are multiplexed by code division multiple access (CDMA) in the frequency block A, while in the example in FIG. 7, multiple RACHs are multiplexed by time division multiple access (TDMA) in the frequency block A, and in the example in FIG. 8 multiple RACHs are multiplexed by frequency division multiple access (FDMA) in the frequency block A, and in the example in FIG. 9, multiple RACHs are multiplexed by code division multiple access (CDMA) in the frequency block A.

Hereinbelow, with reference to FIG. 7, the allocation of the resources in the radio uplink in the mobile communication system according to this embodiment will be described.

Figure 7:
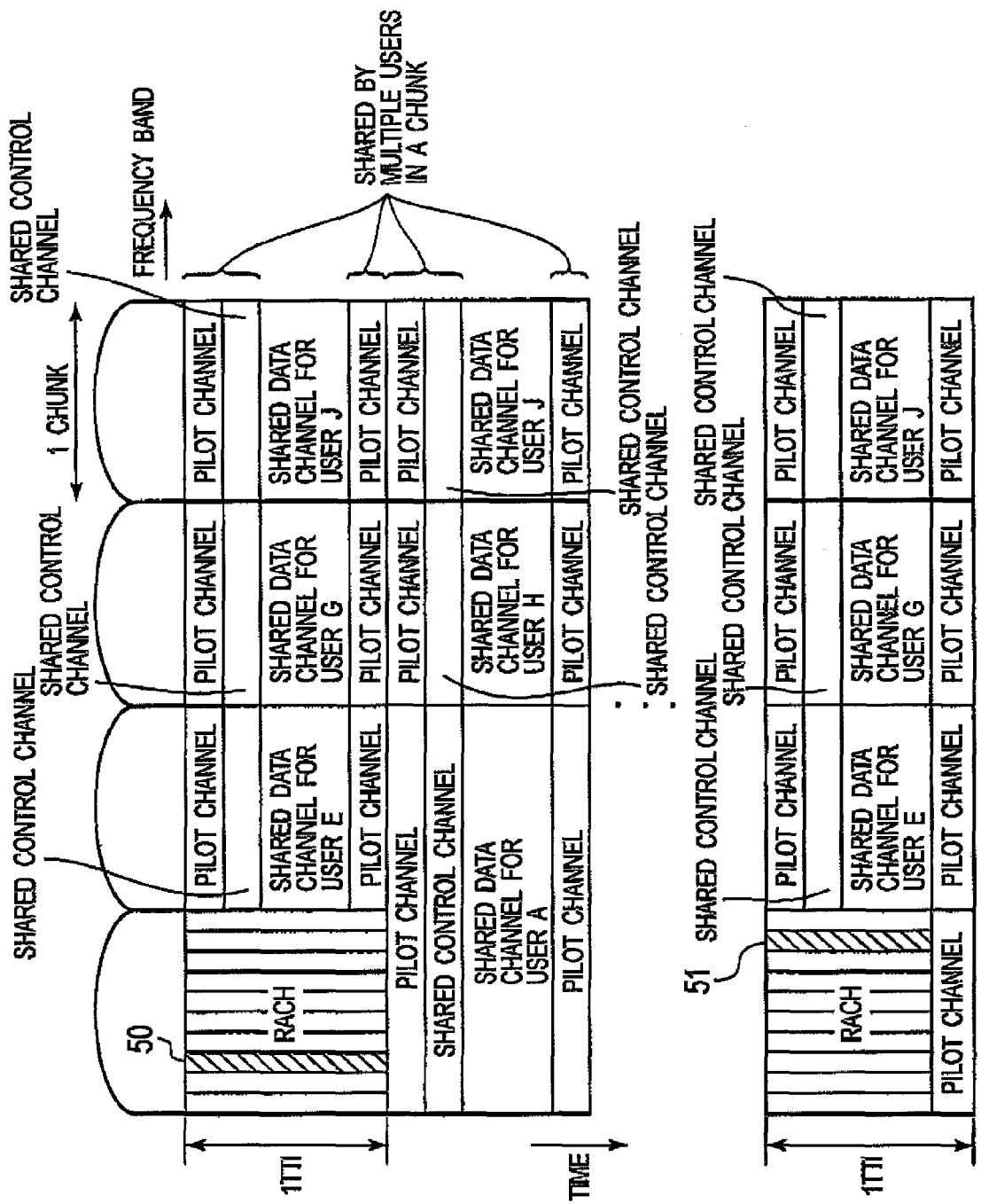
FIG. 7 is a diagram showing an allocation example of the resource of the radio uplink in the mobile communication system according to the first embodiment of the present invention.

In the example shown in FIG. 7, the multiple RACHs are multiplexed by the time division multiple access (TDMA) in the frequency block A.

In the example shown in FIG. 7, it is assumed that the mobile station UE acknowledges that the random access request transmitted through a RACH 50, which is multiplexed by the time division multiple access in the frequency block A, has not been received at the radio base station eNodeB.

Then, the mobile station UE is configured to change a frequency band resource used for the previous transmission at the mobile station UE, and to transmit the random access request to the radio base station eNodeB in a frequency band B through a RACH 51, which is multiplexed by the time division multiple access (TDMA).

Figure 8:
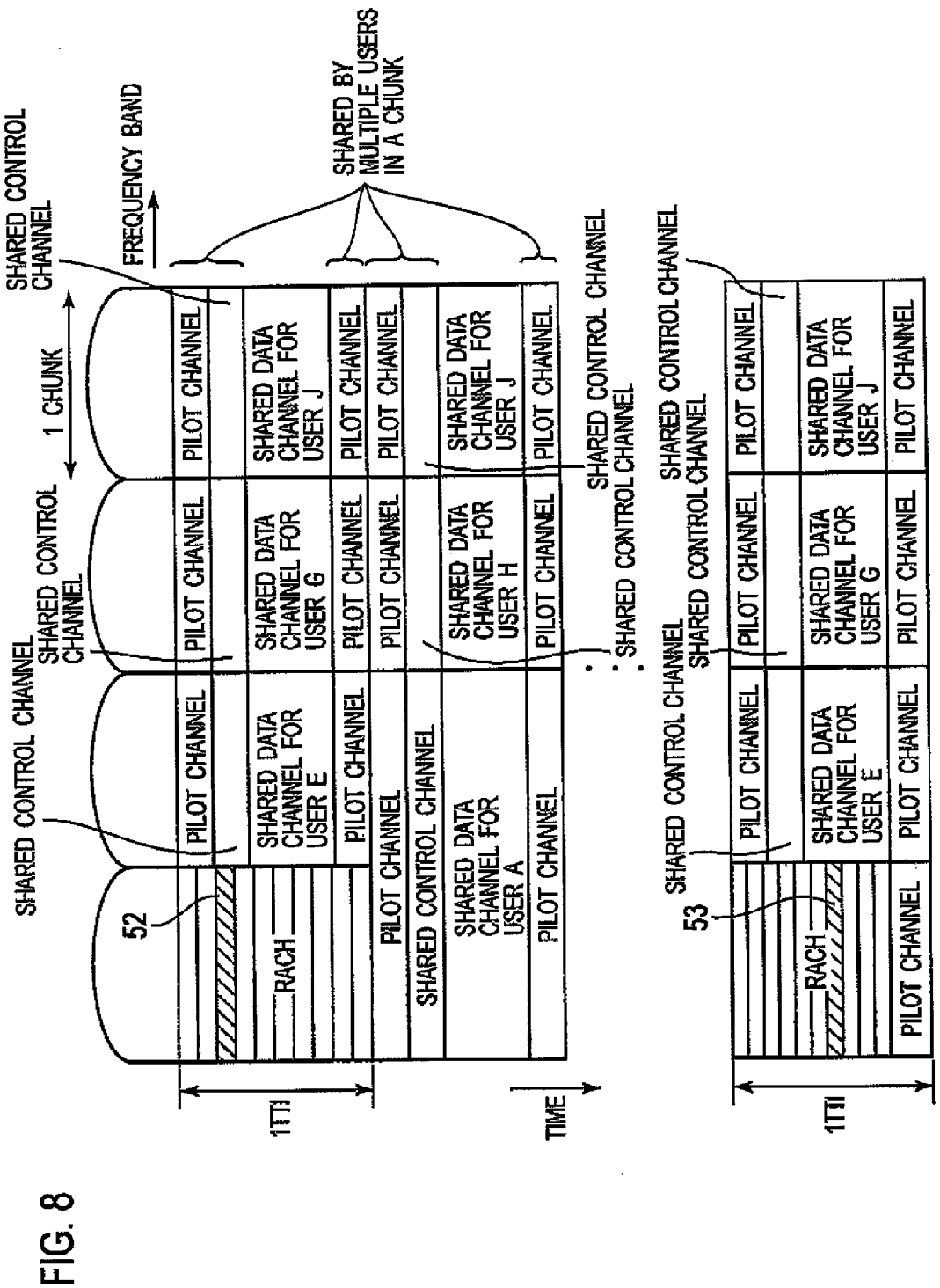
FIG. 8 is a diagram showing an allocation example of the resource of the radio uplink in the mobile communication system according to the first embodiment of the present invention.

In the example shown in FIG. 8, the multiple RACHs are multiplexed by the frequency division multiple access (FDMA) in the frequency block A In the example shown in FIG. 8, the mobile station UE is configured to change a time resource used for the previous transmission at the mobile station UE, and to transmit the random access request to the radio base station eNodeB in the frequency band B through a RACH 53, which is multiplexed by the frequency division multiple access (FDMA).

Figure 9:
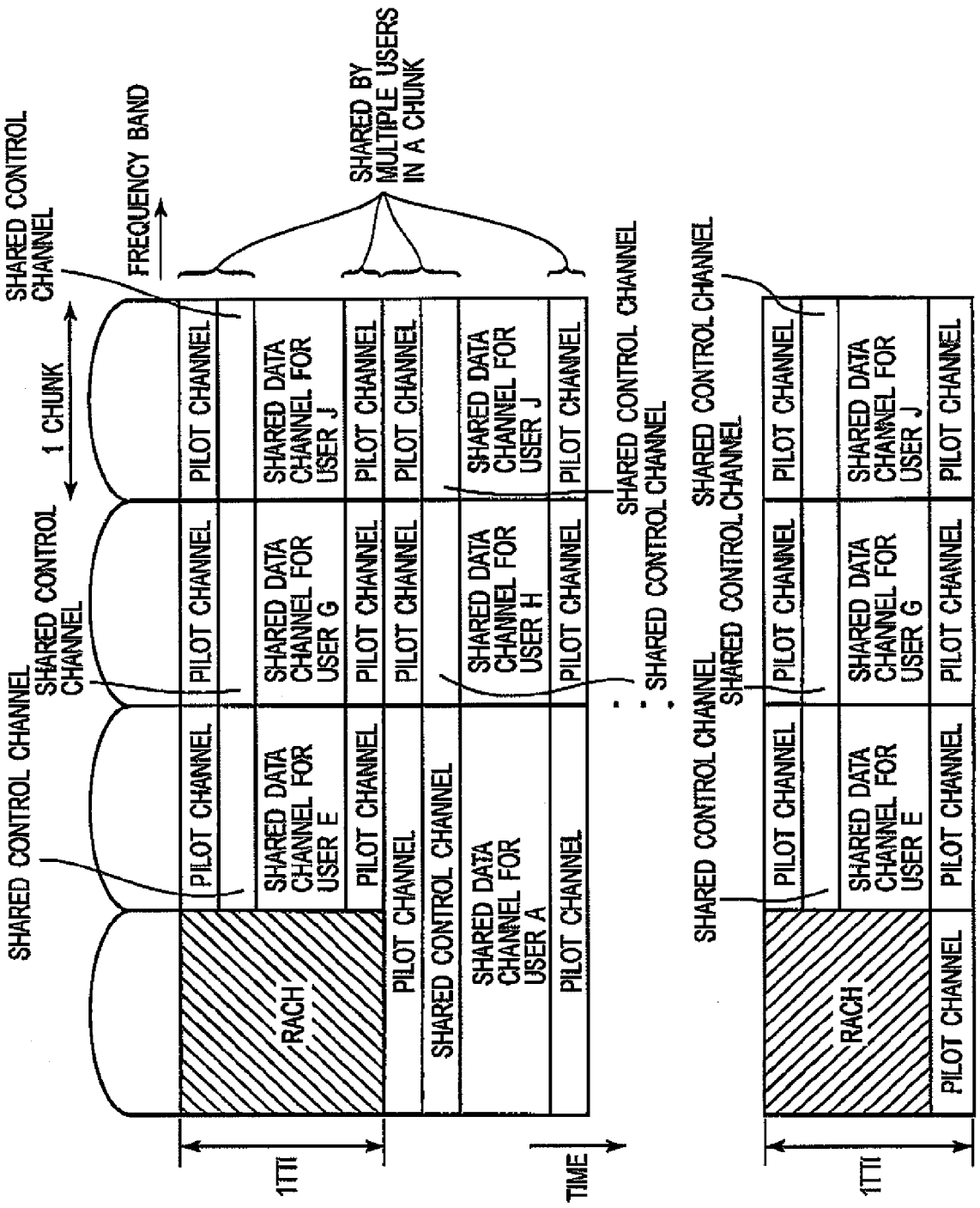
FIG. 9 is a diagram showing an allocation example of the resource of a radio downlink in the mobile communication system according to the first embodiment of the present invention.

In the example in FIG. 9, the multiple RACHs are multiplexed by the code division multiple access (CDMA) in the frequency block A.

In the example shown in FIG. 9, the mobile station UE is configured to change a code resource used for the previous transmission at the mobile station UE, and to transmit the random access request to the radio base station eNodeB in the frequency band 8 through the RACH, which multiplexed by the code division multiple access (CDMA).

(Operations in Mobile Communication System According to First Embodiment of the Present Invention)

Hereinbelow, an operation for a random access control in the mobile communication system according to this embodiment will be described with reference to FIG. 10.

In FIG. 10, neither the mobile station UE #1 nor the mobile station UE #2 has established a communication link with the radio base station eNodeB.

As shown in FIG. 10, in Step S1001, the mobile station UE #1 transmits a random access request that includes mobile station information assigned to the mobile station UE #1, to the radio base station eNodeB through a RACH to which a predetermined radio resource is allocated.

Further, in Step S1001, the mobile station UE #2 transmits a random access request that includes mobile station information assigned to the mobile station UE #2, to the radio base station eNodeB through the RACH to which the predetermined radio resource is allocated.

It is assumed that in Step 1001, the random access request transmitted from the mobile station UE #2 has not to been received at the base station eNodeB for a reason such as the transmission power is too small, or the like.

Here, each of the random access request transmitted from the mobile station UE #1 and the mobile station UE #2 collide with each other, and is transmitted to the radio base station NodeB.

In Step S1002, the radio base station NodeB transmits a random access response for notifying the receipt of the random access request, to the mobile station, UE #1 through a downlink shared control channel corresponding to the RACH used for transmitting the random access request. Here, the random access response includes the mobile station information assigned to the mobile station UE #1.

Here, it is assumed that the radio base station eNodeB notifies, by the random access response, the uplink shared channel used for transmitting a packet random access request at the mobile station UE #1.

In addition, in step S1002, the radio base station NodeB transmits the random access response for notifying the receipt of the random access request so to the mobile station UE #2 through at least one of the downlink shared data channel and the downlink shared control channel corresponding to the RACH used for transmitting the random access request. Here, the random access response includes the mobile station information assigned to the mobile station UE #1.

Here, the radio base station eNodeB also transmits the random access response to the mobile station UE #2, since the collided random access request has been received at the radio base station eNodeB.

Note that the radio resource allocated to the RACH or to the downlink shared control channel corresponding to the RACH may be predetermined.

In Step S1003, the mobile station UE #1 receives the random access response that includes the mobile station information assigned to the mobile station UE #1, through the downlink shared control channel corresponding to the RACH used for transmitting the random access request, and can acknowledge that the random access request has been received at the radio base station eNodeB.

In Step 1004, the mobile station UE #1 transmits the packet random access request to the radio base station eNodeB through the uplink shared channel notified by the aforementioned random access response.

In Step S1005, the radio base station eNodeB transfers the packet random access request to the central node.

In Step S1006, the central node transmits, to the radio base station, a packet random access response for notifying the receipt of the packet random access request.

In Step S1007, the radio base station eNodeB transfers the aforementioned packet random access response to the mobile station UE #1.

In Step S1008, when the packet random access response is received at the mobile station UE #1, a link for transmitting and receiving user data (U-plane) is established between the mobile station UE #1 and the central node.

In Step S1008, the mobile station UE #2 receives the random access response that includes the mobile station information assigned to the mobile station UE #1, through at least one of the downlink shared data channel and the downlink shared control channel corresponding to the RACH used for transmitting the random access request.

The mobile station UE #2 acknowledges that the random access request transmitted from the mobile station UE #2 has not been received at the radio base station eNodeB since the received random access response includes the mobile station information assigned to the mobile station UE #1.

Note that the mobile station UE #2 may acknowledge that the random access request has not been received at the radio base station eNodeB, when the mobile station UE #2 has not received the random access response for a predetermined period, the random access response that includes the mobile station information assigned to the mobile station UE #2.

In Step S1010, the mobile station UE #2 transmits the random access request to the radio base station eNodeB through a RACH to which a radio resource different from the radio resource used in Step S1001 is allocated.

In Step S1011, the radio base station eNodeB transmits a random access request that notifies the receipt of the random access request and includes the mobile station information assigned to the mobile station UE #2, to the mobile station UE #2 through at least one of the downlink shared data channel and the downlink shared control channel corresponding to the RACH used for transmitting the random access request.

The operations in Steps S1012 to S1016 are same as those in the above-described Steps S1004 to S1008, and hence, descriptions of the operations are omitted.

(Advantageous Effects of Mobile Communication System According to First Embodiment of the Present Invention)

The mobile communication system according to this embodiment includes; transmitting, at a mobile station, a random access request that includes mobile station information assigned to the mobile station, to a radio base station through a random access channel allocated to a predetermined radio resource; receiving, at the radio base station, the random access request from the mobile station; and transmitting, at the radio base station, a random access response so signal that notifies the receipt of the random access request and includes the mobile station information, to the mobile station through a downlink shared control channel corresponding to the random access channel. According to the above-described configuration, the mobile station UE can acknowledge that the random access request transmitted from the mobile station UE has been received at the radio base station eNodeB. Thus, an occurrence of an erroneous determination made at the mobile station UE can be reduced.

It is also possible to reduce a processing delay until the determination made by the mobile station UE is turned out to be erroneous. Further, it is possible to reduce the resource wasted at the mobile station UE until the determination made by the mobile station UE is turned out to be erroneous.

Moreover, the mobile communication system according to this embodiment includes: transmitting, at the mobile station, the random access request to the radio base station through the random access channel, by changing the predetermined radio resource for transmitting the radio resource, when the mobile station fails to receive, from the radio base station, the random access response signal that includes the mobile station information. According to the above-described configuration, the mobile station UE can transmit the random access request to the radio base station eNodeB while avoiding a collision when a reason that the mobile station UE fails to receive, from the radio base station eNodeB, the random access response signal that includes the mobile station information is owing to the collision.

Moreover, when the reason that the mobile station UE fails to receive, from the radio base station eNodeB, the random access response signal that includes the mobile station information is owing to the collision, the above-described configuration makes it possible to avoid an occurrence of continuous collisions. As a result, a frequency diversity effect can be obtained.

INDUSTRIAL APPLICABILITY

As described above, the present invention makes it possible to provide a packet communication method, a mobile station, and a radio base station, which can reduce an occurrence of erroneous determination made at the mobile station when a packet communication is Initiated between the mobile station and the base station.

The invention claimed is:

1. A packet communication method, comprising the steps of:
   (A) transmitting, from a mobile station to a radio base station, a random access request that includes mobile station information assigned to the mobile station, through a random access channel allocated to a predetermined radio resource;
   (B) receiving, at the radio base station, the random access request from the mobile station; and
   transmitting, from the radio base station to the mobile station, a random access response that notifies the receipt of the random access request and includes the mobile station information, through a downlink shared channel; and
   (C) transmitting, from the mobile station to the radio base station, the random access request, by changing a radio resource used for transmitting the random access channel, when the mobile station fails to receive, from the radio base station, the random access response that includes the mobile station information,
   wherein in the step (B), when a handover is performed, the radio base station notifies, to the mobile station, a preamble signal pattern to be used by the mobile station and is specified by a radio base station which is the destination of the handover, as additional information of the mobile station information.

2. A mobile station, comprising:
   a transmitter unit configured to transmit, to a radio base station, a random access request that includes mobile station information assigned to the mobile station, through a random access channel defined by a predetermined radio resource; and
   a receiver unit configured to receive a random access response that includes the mobile station information;
   wherein the transmitter unit is configured to transmit, to a radio base station, the random access request, by changing a radio resource used for transmitting the random access channel, when the random access response receiver unit fails to receive, from the radio base station, the random access response that includes the mobile station information; and
   when a handover is performed, the receiver unit is configured to receive a preamble signal pattern to be used by the mobile station and is specified by a radio base station which is the destination of the handover, as additional information of the mobile station information.

3. A radio base station, comprising:
   a receiver unit configured to receive a random access request that includes mobile station information assigned to a mobile station, from the mobile station through a random access channel defined by a predetermined radio resource; and
   a transmitter unit configured to transmit, to the mobile station, a random access response that notifies the receipt of the random access request and includes the mobile station information through a downlink shared channel;
   wherein the receiver unit is configured to receive the random access request which the mobile station transmits by changing a radio resource used for transmitting the random access channel, when the mobile station fails to receive the random access response that includes the mobile station information; and
   when a handover is performed, the transmitter unit is configured to transmit, to the mobile station, a preamble signal pattern to be used by the mobile station and is specified by a radio base station which is the destination of the handover, as additional information of the mobile station information.

* * * * *